(12) United States Patent
Singh (10) Patent No.: US 7,272,600 B1
(45) Date of Patent: Sep. 18, 2007

(54) MIGRATING LARGE DATA SETS FOR PRODUCTS UPGRADES

(75) Inventor: Gunjeet Singh, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 495 days.

(21) Appl. No.: 10/808,797

(22) Filed: Mar. 24, 2004

(51) Int. Cl.
*G06F 17/30* (2006.01)

(52) U.S. Cl. ............... 707/4; 707/1; 707/100; 707/200; 707/205

(58) Field of Classification Search ........... 707/1–10, 707/101, 102, 204, 100, 200, 205; 709/225, 709/230; 713/184; 726/1
See application file for complete search history.

(56) References Cited

U.S. PATENT DOCUMENTS

| | | |
|---|---|---|
| 6,549,901 B1 | 4/2003 | Loaiza et al. |
| 2005/0005132 A1* | 1/2005 | Yantzi .................. 713/184 |

OTHER PUBLICATIONS

Oracle Corporation, "Transportable Tablespaces in Oracle8i™," An Oracle Technical White Paper, Apr. 1999, pp. 1-19.

* cited by examiner

*Primary Examiner*—John Breene
*Assistant Examiner*—Fred I Ehichioya
(74) *Attorney, Agent, or Firm*—Hickman Palermo Truong & Becker, LLP (57) ABSTRACT

A mechanism is disclosed for migrating large data sets for product upgrades. In one embodiment, an identifier is received as a parameter of a first method of an API. In response to the receipt of the identifier as a parameter of the first method, a utility is invoked. The utility exports, as one or more transportable tablespaces, one or more database objects that are associated with the identifier in a database. The identifier is also received as a parameter of a second method of the same API. In response to the receipt of the identifier as a parameter of the second method of the API, a utility is also invoked. The utility imports, into the database, database objects that are contained in the one or more transportable tablespaces. The utility also associates, with the identifier, the database objects that are contained in the one or more transportable tablespaces.

1 Claim, 8 Drawing Sheets

MIGRATING LARGE DATA SETS FOR PRODUCTS UPGRADES

BACKGROUND

Some computer programs are designed in a manner such that the core functionality offered by those "base" computer programs can be extended through interaction with one or more optional "add-on" programs. Implementing optional functionality in add-on programs rather than in a base program provides many benefits. If a user needs the functionality offered by some add-on programs but not other add-on programs, then the user can install only those add-on programs that implement the functionality that the user needs. Add-on developers often can develop add-on programs for an existing base program at less cost and in less time than if those add-on developers had to develop a complete stand-alone program from scratch.

Furthermore, when optional functionality is implemented in an add-on program, that functionality often can be enhanced through a new version of the add-on program. The new version of the add-on program can replace the old version of the add-on program without modifying the base program or any other add-on programs. The old version of the add-on program may be uninstalled, and the new version of the program may be installed in its place.

Sometimes, both a base program and an add-on program store data in a database. The add-on program may store the add-on program's data in the same database in which the base program's data is stored. All of the data in the database is structured according to a format that a particular version of a database server program understands. The base program and the add-on program access their respective data through the database server program, which may be embedded within the base program itself.

When a new version of a base program becomes available, the new version of the base program may contain features that were not available in the old version of the base program. Some of the features in the new version of the base program may require the use of functionality that is not implemented in a currently installed version of the database server program. Consequently, the uninstallation of an old version of a base program and the installation of a new version of the base program often involves the uninstallation of a database server program embedded within the old version of the base program and the installation of a database server program embedded within the new version of the base program.

When a database server program is uninstalled, data contained in the corresponding database typically needs to be migrated. Data migration typically involves the exporting of data from the database prior to the uninstallation of the database server program followed by the importing of the exported data into the database after the re-installation of the same or newer version of the database server program.

Theoretically, each add-on program could contain separate code for migrating that add-on program's data. However, developers of add-on programs might not have enough familiarity with the database server program to generate such code. If a particular add-on program's migration code contained errors, then data in the database might become lost or corrupted.

Each add-on program might store a very large amount of data in the database. When applied to a large amount of data, some conventional approaches to migrating data take a very long time.

SUMMARY

In accordance with one embodiment of the present invention, a mechanism is disclosed for migrating large data sets for product upgrades. In one embodiment, an identifier is received as a parameter of a first method of an application programming interface ("API"). In response to the receipt of the identifier as a parameter of the first method, a utility is invoked. The utility exports, as one or more transportable tablespaces, one or more database objects that are associated with the identifier in a database. The identifier is also received as a parameter of a second method of the same API. In response to the receipt of the identifier as a parameter of the second method of the API, a utility is also invoked. The utility imports, into the database, database objects that are contained in the one or more transportable tablespaces. The utility also associates, with the identifier, the database objects that are contained in the one or more transportable tablespaces.

DETAILED DESCRIPTION OF EMBODIMENT(S)

Overview

Figure 1:
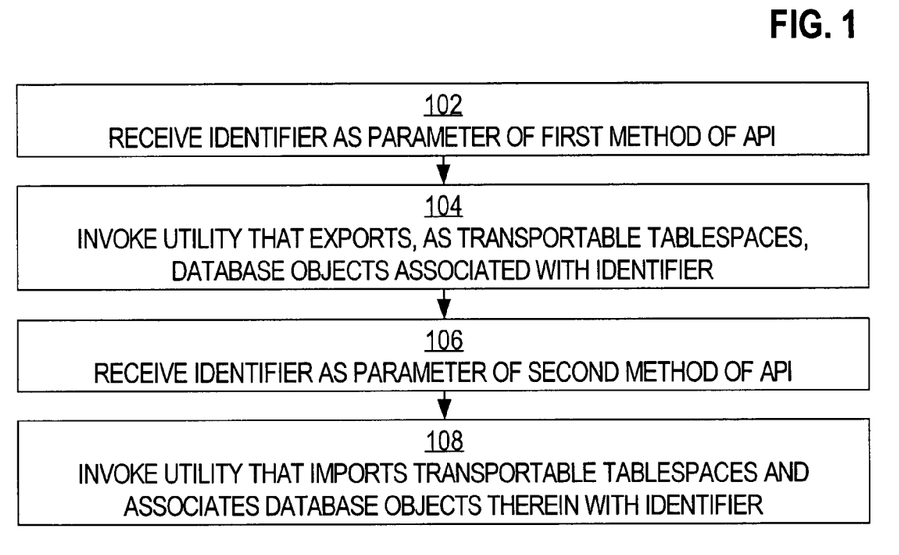
FIG. 1 depicts an overview of an operational flow for migrating large data sets for product upgrades, in accordance with one embodiment of the present invention.

FIG. 1 depicts an overview of an operational flow for migrating large data sets for product upgrades, in accordance with one embodiment of the present invention. In block 102, an identifier is received as a parameter of a first method of an application programming interface. In block 104, in response to receiving the identifier as a parameter of the first method, a utility is invoked. The utility exports, as one or more transportable tablespaces, one or more database objects that are associated with the identifier in a database.

In block 106, the identifier is received as a parameter of a second method of the application programming interface. In block 108, in response to receiving the identifier as a parameter of the second method, a utility is invoked. The utility imports, into the database, database objects that are contained in the one or more transportable tablespaces. The utility associates, with the identifier, the database objects that are contained in the one or more transportable tablespaces.

Sample Implementation

Figure 2:
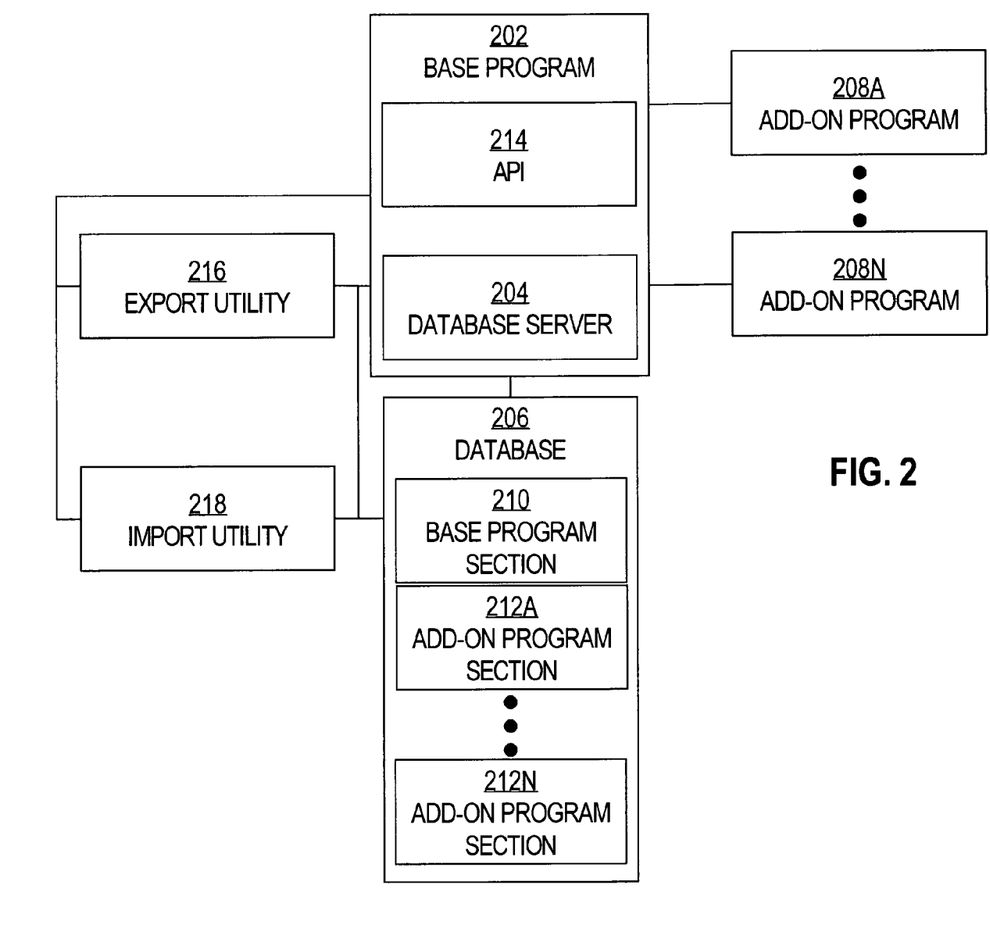
FIG. 2 is a functional block diagram of a base program, which interfaces with one or more add-on programs, and in which one embodiment of the present invention may be implemented.

FIG. 2 is a functional block diagram of a base program, which interfaces with one or more add-on programs, and in which one embodiment of the present invention may be implemented. Database server 204 is embedded within base program 202. Database server 204 to cause data to be stored, retrieved, and modified in database 206. Add-on programs 208A-N also interface with database server 204 to cause data to be stored, retrieved, and modified in database 206.

Database 206 comprises a base program section 210 and add-on program sections 212A-N. Database objects "owned" by base program 202 are stored in base program section 210. Database objects "owned" by add-on programs 208A-N are stored in add-on program sections 212A-N, respectively. Database objects may include, for example, database tables, views, stored procedures, indices, triggers, etc.

According to one embodiment, each one of sections 210 and 212A-N is associated with a different identifier. Each such identifier is also called a "database username." For each particular section, database objects in the particular section are associated with the identifier that is associated with the particular section.

According to one embodiment, each one of sections 210 and 212A-N is associated with a separate password. In one embodiment, for each particular section, a program is prevented from accessing database objects within a particular section unless the program supplies the password that is associated with the particular section. In this manner, add-on programs may be prevented from accessing database objects that those add-on programs do not "own."

Base program 202 implements an API 214. API 214 comprises one or more methods that are invocable by each of add-on programs 208A-N. Each particular method is associated with a different method name that is used to invoke the particular method. When an add-on program invokes a method of API 214, the add-on program may specify, in the invocation, one or more values that are passed as parameters to the code that implements the method. Because the code for each method of the API is implemented in base program 202, add-on programs 208A-N do not need to implement their own versions of the code separately. API 214 provides a uniform set of functions, accessible through a uniform interface, to each of add-on programs 208A-N.

As is discussed above, the uninstallation and re-installation of the same or a newer version of database server 204 (which may accompany the uninstallation and re-installation of the same or a newer version of base program 202) may require the migration of database objects previously stored in database 206. According to one embodiment, any of add-on programs 208A-N may migrate the database objects that the add-on program "owns" by invoking one or more of the methods of API 214.

For example, add-on program 208A may invoke a first method of API 214, specifying, as a parameter of the first method, the identifier that is associated with add-on section 212A. For example, add-on program 208A may invoke a "db_do_export" method of API 214, described below. Add-on program 208A may invoke the first method as part of an uninstall mechanism that uninstalls an old version of add-on program 208A, for example. Based on the identifier, the first method may cause the database objects contained in add-on section 212A to be exported from database 206 as one or more transportable tablespaces. Transportable tablespaces are discussed further below.

Continuing the example, add-on program 208A may invoke a second method of API 214, specifying, as a parameter of the second method, the identifier that is associated with add-on section 212A. For example, add-on program 208A may invoke a "db_do_tt_import" method of API 214, described below. Add-on program 208A may invoke the second method as part of an install mechanism that installs a new version of add-on program 208A, for example. Based on the identifier, the second method may cause the database objects contained in the one or more transportable tablespaces to be imported into database 206, in the section that is associated with the identifier. As a result, the database objects contained in add-on section 212A are preserved Continuing the example, after the database objects have been imported, add-on program 208A may modify the database objects so that the database objects conform to a new and different schema. Add-on program 208A may perform these modifications as part of an install mechanism of a new version of add-on program 208A, for example.

Sample API Methods

In one embodiment, API 214 comprises several separate methods, having the following method names: "db_do_export," "db_migr_export_present," "db_migr_read_meta," "db_do_re_import," "db_do_tt_import," and "db_migr_import_user." Each of these methods is discussed further below.

"db_do_export"

In one embodiment, the "db_do_export" method accepts values for the following parameters: "db_username," "passwd," "type," and "logfile." According to one embodiment, when a program invokes the "db_do_export" method, the "db_do_export" method determines whether the password specified in the "passwd" parameter is the correct password that is associated with the database username (i.e., identifier) specified in the "db_username" parameter.

If the password is correct, then, in one embodiment, the "db_do_export" method invokes a utility that exports the database objects contained in the database section associated with the specified database username according to a technique specified in the "type" parameter. In one embodiment, the "type" parameter's value may be either "regular_export" or "transportable_tablespaces."

For example, the "db_do_export" method may invoke an "EXPORT" utility 216, provided by Oracle Corporation with the Oracle8i database server product. If the "type" parameter specifies "regular_export," then the "db_do_export" method may invoke "EXPORT" utility 216 with a command-line flag that specifies "DIRECT=Y," thereby indicating that the database objects are to be exported using regular export and not as transportable tablespaces. Alternatively, if the "type" parameter specifies "transportable_tablespaces," then the "db_do_export" method may invoke "EXPORT" utility 216 with a command-line flag that specifies "TRANSPORTABLE_TABLESPACES=Y," thereby indicating that the database objects are to be exported as transportable tablespaces. As other parameters of the "EXPORT" utility, the "db_do_export" method identifies the database tablespaces that are to be exported, which are the tablespaces that contain the database objects that are contained in the database section associated with the specified database username.

According to one embodiment, if the "type" parameter specifies "transportable_tablespaces," then, before invoking "EXPORT" utility 216, the "db_do_export" method performs one or more determinations relative to the database objects contained in the specified database section to ensure that the database objects are in a condition that permits the database objects to be exported as transportable tablespaces. For example, the "db_do_export" method may determine whether the database objects in the specified database section are "self-contained." A database object in a database section is "self-contained" if the database object does not refer to any database object that is outside of the specified database section. If the database objects in the specified database section are not self-contained, or otherwise not in suitable condition for export as transportable tablespaces, then the "db_do_export" method may indicate to the invoking program that the program's database objects cannot be exported as transportable tablespaces.

According to one embodiment, if "EXPORT" utility 216 is invoked with the "DIRECT=Y" flag, then the "EXPORT" utility saves, in a "dump file," the data within the database objects contained in the specified database section. The dump file may be saved with a name that corresponds to the database username with which the database objects were associated in database 206, so that, given the database username, other methods of API 214 can locate the dump file. In addition to this, an export metafile is created with a name that corresponds to the database username. The export metafile indicates the export type (i.e., regular_export) and the location of the export dump file.

According to one embodiment, if "EXPORT" utility 216 is invoked with the "TRANSPORTABLE_TABLESPACES=Y" flag, then the "EXPORT" utility exports transportable tablespaces metadata that corresponds to the database objects contained in the specified database section. A transportable tablespace metadata dump file, which contains information needed to import the transportable tablespaces, may be saved with a name that corresponds to the database username with which the database objects were associated in database 206, so that, given the database username, other methods of API 214 can locate the transportable tablespace metadata dump file. An export metafile indicates the export type (i.e., transportable_tablespaces), the name of the transportable tablespaces metadata dump file, and a list of transportable tablespace names and location of the data files that correspond to each of these tablespaces.

Exporting database objects as transportable tablespaces and importing the resulting transportable tablespaces is typically faster than exporting and importing database objects using conventional techniques, because exporting and importing database objects as transportable tablespaces bypasses the relatively slower data extract and load processes used by conventional techniques. Using transportable tablespaces, entire data files in the database are "plugged out" and then later "plugged in" for instant availability. Exporting and importing an entire data file bypasses the SQL engine, and is usually much faster than exporting and importing the database objects in the data file an object at a time. Thus, by using transportable tablespaces, large data sets can be migrated from one version of a database server to another in significantly less time.

In one embodiment, the "db_do_export" method saves information to an export metafile that is stored in a directory that corresponds to the database username with which the database objects were associated in database 206, so that, given the database username, other methods of API 214 can locate the export metafile. In one embodiment, the information saved in the export metafile indicates whether the value of the "type" parameter was "regular_export" or "transportable_tablespaces," a version number of a program, and a location of an SQL script that may be used to re-create sequences. If the value of the "type" parameter was "regular_export," then the information saved in the export metafile may indicate a location of the "dump file." If the value of the "type" parameter was "transportable_tablespaces" then the export metafile may indicate a location of the transportable tablespace metadata dump file file, a space-separated list of tablespaces that were exported, and a space-separated list of pathnames of the data files in which the exported tablespaces were stored.

"db_migr_export_present"

In one embodiment, the "db_migr_export_present" method accepts a value for a single parameter, "db_username." According to one embodiment, when a program invokes the "db_migr_export_present" method, the "db_migr_export_present" method determines whether any exported data exists for the database username that is specified in the "db_username" parameter. For example, the "db_migr_export_present" method may determine this based on whether an export metafile exists with a name that corresponds to the specified database username.

"db_migr_read_meta

In one embodiment, the "db_migr_read_meta" method accepts a value for a single parameter, "db_username." According to one embodiment, when a program invokes the "db_migr_read_meta" method, the "db_migr_read_meta" method reads the information in the export metafile that is in a predetermined directory with a file name that corresponds to the database username specified in the "db_username" parameter. In one embodiment, the "db_migr_read_data" method stores this information in one or more environment variables that are accessible to other methods of API 214. For example, the "db_migr_read_data" method may store, in a separate environment variable, each of the information items that the "db_do_export" method stored in the export metafile as described above.

"db_do_re_import"

In one embodiment, the "db_do_re_import" method accepts values for the following parameters: "db_username," "user_passwd," "dmpfile," and "logfile." According to one embodiment, when a program invokes the "db_do_re_import" method, the "db_do_re_import" method determines whether the password specified in the "user_passwd" parameter is the correct password that is associated with the database username (i.e., identifier) specified in the "db_username" parameter.

If the password is correct, then, in one embodiment, the "db_do_re_import" (for "do regular import") method invokes a utility that imports, into database 206, the database objects contained in the "dump file" specified in the "dmpfile" parameter. For example, the "db_do_re_import" method may invoke an "IMPORT" utility 218, provided by Oracle Corporation with the Oracle8i database server product. The "db_do_re_import" may invoke "IMPORT" utility 218 with command-line flags to specify from_user and to_user and the export dump file name, thereby indicating that the database objects to be imported are not stored as transportable tablespaces. As a result, "IMPORT" utility 218 reads the database objects that are stored in the "dump file" and inserts the database objects into database 206, in the database section that is associated with the database username specified in the "db_username" parameter.

"db_do_tt_import"

In one embodiment, the "db_do_tt_import" (for "do transportable tablespace import") method accepts values for the following parameters: "db_username," "user_passwd," and "logfile." According to one embodiment, when a program invokes the "db_do_tt_import" method, the "db_do_tt_import" method determines whether the password specified in the "user_passwd" parameter is the correct password that is associated with the database username (i.e., identifier) specified in the "db_username" parameter.

If the password is correct, then, in one embodiment, the "db_do_tt_import" method invokes a utility that "plugs in", to database 206, the transportable tablespaces that are specified in one or more environment variables that were previously set by the "do_migr_read_meta" method as described above. For example, the "db_do_tt_import" method may invoke "IMPORT" utility 218. The "db_do_tt_import" may invoke "IMPORT" utility 218 with a command-line flag that specifies "TRANSPORTABLE_TABLESPACES=Y," thereby indicating that transportable tablespaces are to be "plugged in" to database 206. The name of the transportable tablespaces, the location of the corresponding data files, and the location of the transportable tablespaces metadata dump file are read from the export metafile. As a result, "IMPORT" utility 218 "plugs in" the transportable tablespaces and their associated data files that are indicated in the environment variables. This causes the database objects contained in the transportable tablespaces to become a part of database 206, in the database section that is associated with the database username specified in the "db_username" parameter.

"db_migr_import_user"

In one embodiment, the "db_migr_import_user" method accepts values for the following parameters: "db_username," "user_passwd," and "logfile." According to one embodiment, when a program invokes the "db_migr_import_user" method, the "db_migr_import_user" method determines whether the password specified in the "user_passwd" parameter is the correct password that is associated with the database username (i.e., identifier) specified in the "db_username" parameter.

If the password is correct, then, in one embodiment, the "db_migr_import_user" reads the export metafile that corresponds to the specified database username. If the value of the "type" parameter that was stored in the export metafile is "regular_export," then the "db_migr_import_user" method invokes the "db_do_re_import" method as described above, passing the location of the "dump file," as indicated in the export metafile, as a parameter to the "db_do_re_import" method. Alternatively, if the value of the "type" parameter that was stored in the export metafile is "transportable_tablespaces," then the "db_migr_import_user" method invokes the "db_do_tt_import" method as described above.

Sample Operation

Figure 3A:
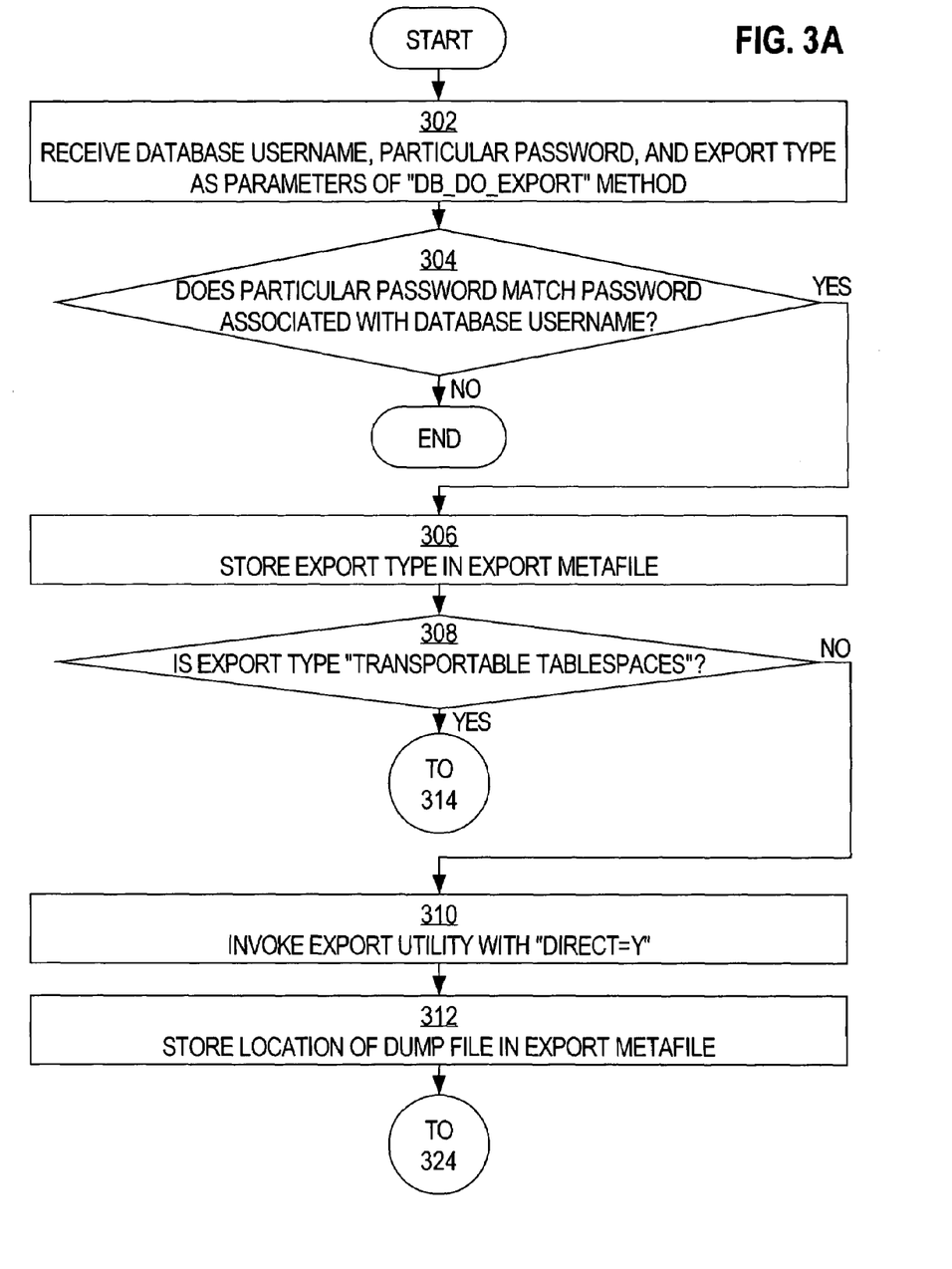
FIGS. 3A, 3B, 3C, 3D, and 3E depict a more detailed operational flow for migrating large data sets for product upgrades, in accordance with one embodiment of the present invention.

FIGS. 3A, 3B, 3C, 3D, and 3E depict a more detailed operational flow for migrating large data sets for product upgrades, in accordance with one embodiment of the present invention. Referring to FIG. 3A, in block 302, a database username, a particular password, and an export type are received as parameters of the "db_do_export" method of API 214. In block 304, it is determined whether the particular password matches a password that is associated with the database username. This determination may be performed by the "db_do_export" method of API 214, for example. If the passwords match, then control passes to block 306. Alternatively, if the passwords do not match, then the operational flow ends.

In block 306, the export type is stored in an export metafile that is associated with the database username. The export type may be stored, for example, by the "db_do_export" method of API 214. In block 308, it is determined whether the export type is "regular_export" or "transportable_tablespaces." This determination may be performed by the "db_do_export" method of API 214, for example. If the export type is "regular_export," then control passes to block 310. If the export type is "transportable_tablespaces," then control passes to block 314.

In block 310, "EXPORT" utility 216 is invoked with the "DIRECT=Y" flag and information that identifies the database objects that are contained in the database section that is associated with the database username. For example, the "db_do_export" method of API 214 may invoke "EXPORT" utility 216 in this manner. As a result, database objects that are contained in the database section that is associated with the database username are exported to a "dump file."

In block 312, the location of the "dump file" is stored in the export metafile that is associated with the database username. For example, the "db_do_export" method of API 214 may perform this storage. Control passes to block 324.

Figure 3B:
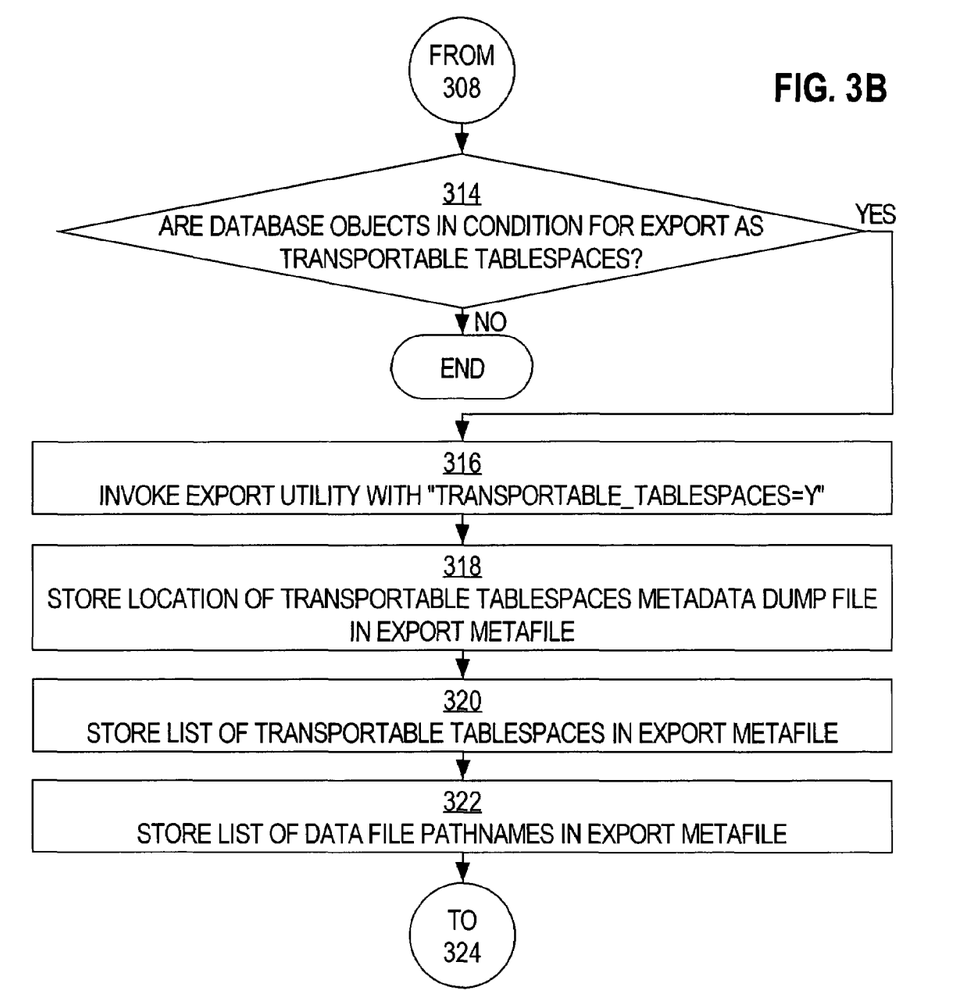

Alternatively, referring to FIG. 3B, in block 314, it is determined whether the database objects that are in the database section associated with the database username are in a condition that permits the database objects to be exported as transportable tablespaces. For example, the "db_do_export" method may determine whether the database objects in the specified database section are "self-contained." If the database objects are in a condition that is conducive to export as transportable tablespaces, then control passes to block 316. Otherwise, the operational flow ends.

In block 316, "EXPORT" utility 216 is invoked with the "TRANSPORTABLE_TABLESPACES=Y" flag and information that identifies the tablespaces that contain the database objects that are contained in the database section that is associated with the database username. For example, the "db_do_export" method of API 214 may invoke "EXPORT" utility 216 in this manner. As a result, database objects that are contained in the database section that is associated with the database username are exported as one or more transportable tablespaces, and a transportable tablespace metadata dump file is generated.

In block 318, the location of the transportable tablespace metadata dump file generated by "EXPORT" utility 216 is stored in the export metafile that is associated with the database username. In block 320, a space-separated list of tablespaces that were exported by "EXPORT" utility 216 is stored in the export metafile that is associated with the database username. In block 322, a space-separated list of pathnames of the data files in which the exported tablespaces were stored is stored in the export metafile. For example, the "db_do_export" method of API 214 may store the location and the lists in the export metafile. Control passes to block 324.

Figure 3C:
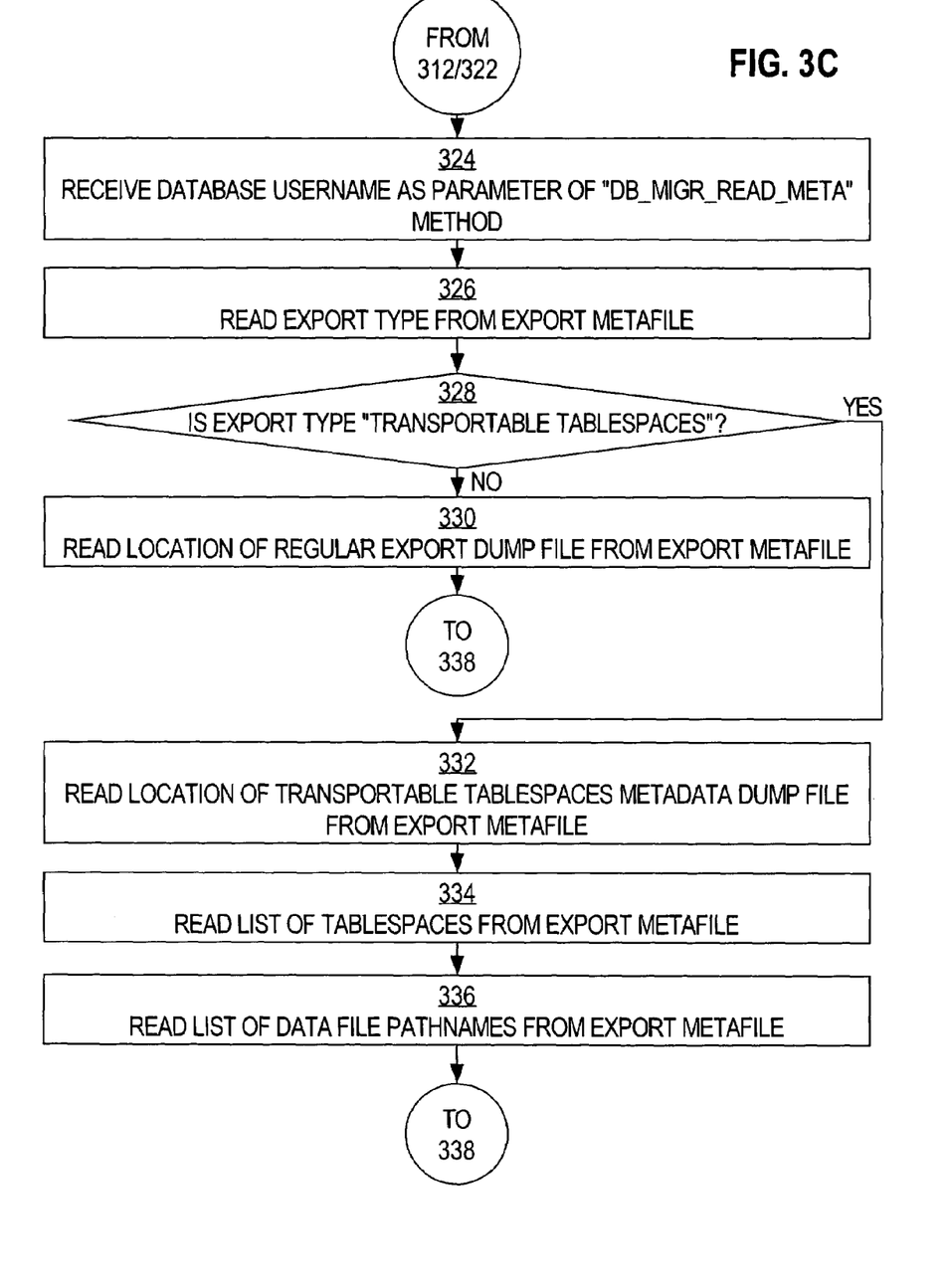

Referring to FIG. 3C, in block 324, the database username is received as a parameter of the "db_migr_read_meta" method of API 214. In block 326, an indication of the type of export that was performed is read from the export metafile that is associated with the database username. The indication of the export type may be stored in a "MIGR_EXPORT_TYPE" environment variable. For example, the "db_migr_read_meta" method of API 214 may perform this reading and storing.

In block 328, it is determined whether the export type is "regular_export" or "transportable_tablespaces." This determination may be performed by the "db_migr_read_meta" method of API 214, for example. If the export type is "regular_export," then control passes to block 330. If the export type is "transportable_tablespaces," then control passes to block 332.

In block 330, the location of the "dump file" is read from the export metafile that is associated with the database username. The location may be stored in a "MIGR_RE_DUMPFILE" environment variable. For example, the "db_migr_read_meta" method of API 214 may perform this reading and storing. Control passes to block 338.

Alternatively, in block 332, the location of the transportable tablespaces metadata dump file is read from the export metafile that is associated with the database username. The location may be stored in a "MIGR_TT_DUMPFILE" environment variable. In block 334, the list of tablespaces is read from the export metafile. The list of tablespaces may be stored in a "MIGR_TT_TABLESPACES" environment variable. In block 336, the list of data file pathnames is read from the export metafile. The list of pathnames may be stored in a "MIGR_TT_DATAFILES" environment variable. For example, the "db_migr_read_meta" method of API 214 may perform this reading and storing. Control passes to block 338.

Figure 3D:
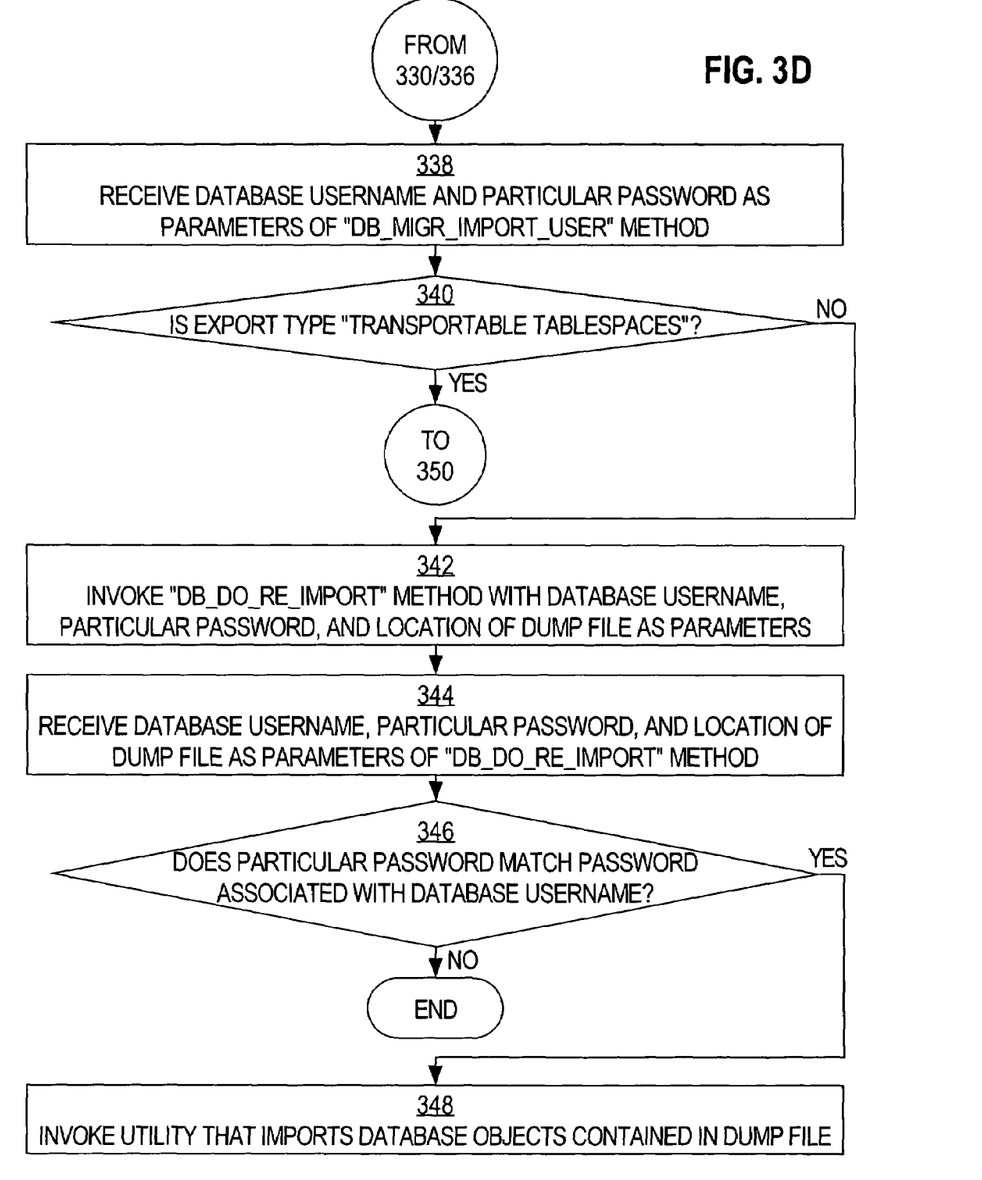

Referring to FIG. 3D, in block 338, the database username and the particular password are received as parameters of the "db_migr_import_user" method of API 214. In block 340, it is determined whether the export type is "regular_export" or "transportable_tablespaces." This determination may be performed by the "db_migr_read_meta" method of API 214, for example, by examining the contents of the export metafile associated with the database username. If the export type is "regular_export," then control passes to block 342. If the export type is "transportable_tablespaces," then control passes to block 350.

In block 342, the "db_do_re_import" method of API 214 is invoked with the database username, the particular password, and the location of the "dump file" as parameters. For example, the "db_migr_import_data" method of API 214 may perform this invocation. The location of the "dump file" may be obtained, for example, from the "MIGR_RE_DUMPFILE" environment variable that was set by the "db_migr_read_meta" method of API 214.

In block 344, the database username, the particular password, and the location of the "dump file" are received as parameters of the "db_do_re_import" method of API 214. In block 346, it is determined whether the particular password matches a password that is associated with the database username. This determination may be performed by the "db_do_re_import" method of API 214, for example. If the passwords match, then control passes to block 348. Alternatively, if the passwords do not match, then the operational flow ends.

In block 348, a utility is invoked that imports, into database 206, the database objects contained in the "dump file." For example, the "db_do_re_import" method of API 214 may invoke "IMPORT" utility 218 with command-line flags that specify from_user, to_user, and export dump file location, thereby indicating that the database objects to be imported are from a regular export dump. As a result, "IMPORT" utility 218 reads the database objects that are stored in the "dump file" and inserts the database objects into database 206, in the database section that is associated with the database username.

Figure 3E:
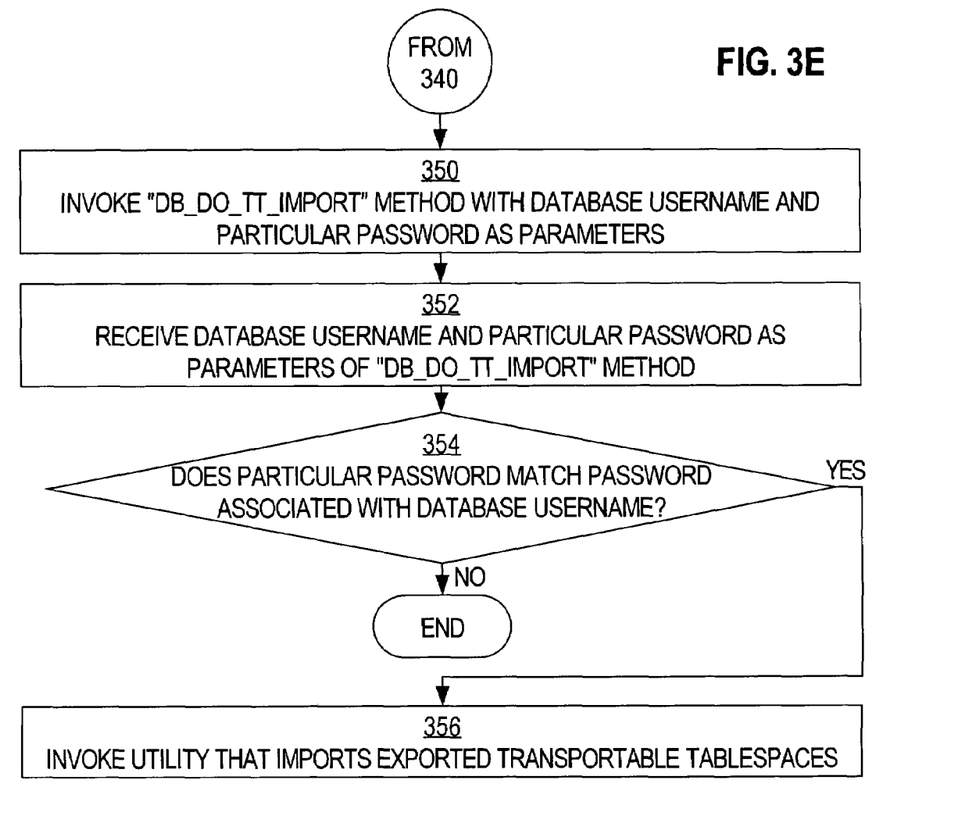

Alternatively, referring to FIG. 3E, in block 350, the "db_do_tt_import" method of API 214 is invoked with the database username and the particular password as parameters. For example, the "db_migr_import_data" method of API 214 may perform this invocation. In block 352, the database username and the particular password are received as parameters of the "db_do_tt_import" method of API 214. In block 354, it is determined whether the particular password matches a password that is associated with the database username. This determination may be performed by the "db_do_tt_import" method of API 214, for example. If the passwords match, then control passes to block 356. Alternatively, if the passwords do not match, then the operational flow ends.

In block 356, a utility is invoked that imports, into database 206, the exported transportable tablespaces. For example, the "db_do_tt_import" method of API 214 may invoke "IMPORT" utility 218 with a command-line flag that specifies TRANSPORTABLE_TABLESPACES=Y," thereby indicating that transportable tablespaces are to be "plugged in" to database 206. As a result, "IMPORT" utility 218 "plugs in" the transportable tablespaces that are indicated in the environment variables set by the "db_migr_read_meta" method of API 214. This causes the database objects contained in the transportable tablespaces to become a part of database 206, in the database section that is associated with the database username.

Hardware Overview

Figure 4:
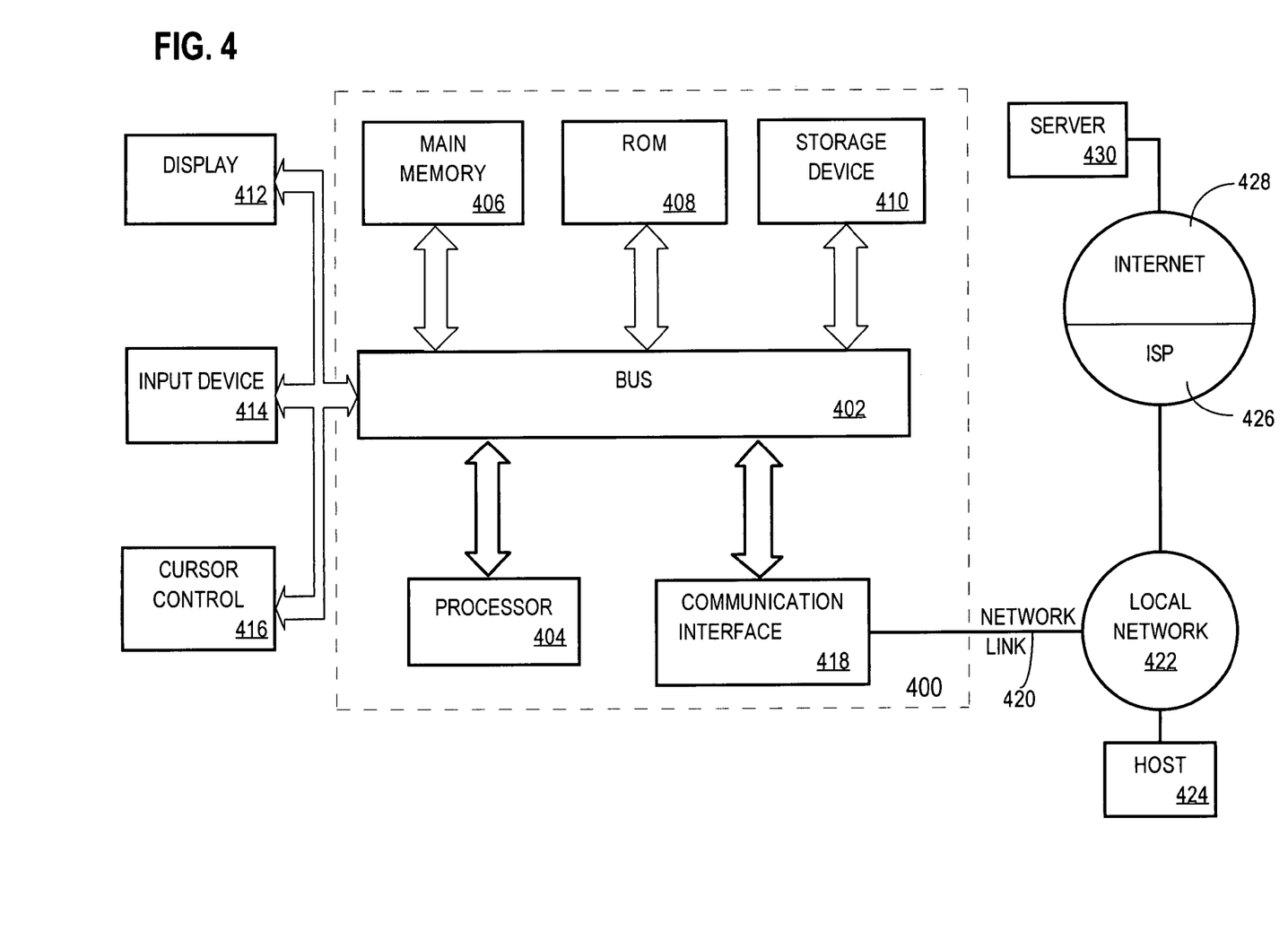
FIG. 4 is a hardware block diagram of a sample computer system, upon which one or more components of an embodiment of the present invention may be implemented.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions. Although the components of computer system 400 are depicted as being within a single chasse, it is contemplated that the components of computer system 400 may be distributed among multiple separate devices that are communicatively coupled via a network.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
   a processor;
   a base program;
   a database server that is embedded within said base program;
   a database; and
   a plurality of add-on programs;
   wherein said database server causes data to be stored, retrieved, and modified in said database;
   wherein each add-on program of said plurality of add-on programs causes data to be stored, retrieved, and modified in said database;
   wherein said database comprises (a) a base program section and (b) a plurality of add-on program sections;
   wherein said base program section stores database objects that are owned by said base program;
   wherein each add-on program section of said plurality of add-on program sections stores database objects that are owned by a separate add-on program of said plurality of add-on programs;
   wherein, for each particular section of said base program section and said plurality of add-on program sections, (a) said particular section is associated a database username that is different from any database username that is associated with any other section, (b) database objects in said particular section are associated with a database username that is associated with said particular section, and (c) said particular section is associated with a password that is separate from any password that is associated with any other section;
   wherein each particular add-on program of said plurality of add-on programs is prevented from accessing database objects within any section of said base program section and said plurality of add-on program sections unless said particular program supplies a password that is associated with a section, of said base program section and said plurality of add-on program sections, that contains database objects that said particular program is attempting to access;
   wherein said base program implements an application programming interface (API);
   wherein said API implements methods that are invocable by each add-on program of said plurality of add-on programs;
   wherein said API provides, to each add-on program of said plurality of add-on programs, a uniform set of functions that are accessible through a uniform interface;
   wherein an uninstallation of said database server requires migration of database objects that are stored in said database;
   wherein, by invoking methods of said API, each separate add-on program of said plurality of add-on programs migrates database objects that said separate add-on program owns;
   wherein, as part of an uninstall mechanism that uninstalls an old version of a first add-on program of said add-on programs, said first add-on program invokes a first method of said API;
   wherein, in invoking said first method of said API, said first add-on program specifies, as a parameter of said first method, a first database username that is associated with a first add-on program section of said plurality of add-on program sections;
   wherein, in response to being invoked with said first database username as a parameter, said first method exports, from said database, as transportable tablespaces, database objects that are contained in said first add-on program section;
   wherein, as part of an install mechanism that installs a new version of said first add-on program, said first add-on program invokes a second method of said API;
   wherein said second method differs from said first method;
   wherein, in invoking said second method of said API, said first add-on program specifies, as a parameter of said second method, said first database username that is associated with said first add-on program section of said plurality of add-on program sections;
   wherein, in response to being invoked with said first database username as a parameter, said second method imports, into said first add-on program section of said database, particular database objects that are contained in said transportable tablespaces;
   wherein, as a part of said install mechanism, after said particular database objects have been imported into said database from said transportable tablespaces, said first add-on program modifies said particular database objects;
   wherein, before said first add-on program modifies said particular database objects, said particular database objects conform to a first schema;
   wherein, after said first add-on program modifies said particular database objects, said particular database objects conform to a second schema that differs from said first schema.

* * * * *

UNITED STATES PATENT AND TRADEMARK OFFICE
CERTIFICATE OF CORRECTION

| | | |
|---|---|---|
| PATENT NO. | : 7,272,600 B1 | Page 1 of 1 |
| APPLICATION NO. | : 10/808797 | |
| DATED | : September 18, 2007 | |
| INVENTOR(S) | : Gunjeet Singh | |

It is certified that error appears in the above-identified patent and that said Letters Patent is hereby corrected as shown below:

Title Page;
In Section (54) on the front page of U.S. Patent No. 7,272,600 B1:

In the Title: Replace "Products" with --Product--

Signed and Sealed this

Twenty-ninth Day of April, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,272,600 B1 | Page 1 of 1 |
| APPLICATION NO. | : 10/808797 | |
| DATED | : September 18, 2007 | |
| INVENTOR(S) | : Gunjeet Singh | |

It is certified that error appears in the above-identified patent and that said Letters Patent is hereby corrected as shown below:

Title Page;
In Section (54) on the front page of U.S. Patent No. 7,272,600 B1:

In the Title and Column 1, line 2: Replace "Products" with --Product--

This certificate supersedes the Certificate of Correction issued April 29, 2008.

Signed and Sealed this

Twentieth Day of May, 2008

JON W. DUDAS
*Director of the United States Patent and Trademark Office*